United States Patent [19]

Rueping

[11] Patent Number: 4,857,940
[45] Date of Patent: Aug. 15, 1989

[54] MOLDED ARTICLE WITH EXPOSED, CONFINED LEADS, AND PROCESS FOR MAKING

[75] Inventor: John E. Rueping, Rochester, N.Y.

[73] Assignee: Eastman Kodak Company, Rochester, N.Y.

[21] Appl. No.: 91,171

[22] Filed: Aug. 31, 1987

[51] Int. Cl.$^4$ .................. A01D 15/18; H05K 5/00
[52] U.S. Cl. ........................... 346/75; 174/50; 174/52.2
[58] Field of Search ............... 346/75; 174/50, 52 PE

[56] References Cited

U.S. PATENT DOCUMENTS

| | | | |
|---|---|---|---|
| 3,387,076 | 6/1968 | Murooka | 264/276 |
| 3,590,136 | 6/1971 | Kunishi et al. | 174/50 |
| 3,860,740 | 1/1975 | Watkins | 174/52 PE |
| 4,560,991 | 12/1985 | Schutrum | 346/75 |
| 4,636,808 | 1/1987 | Herron | 346/75 |

Primary Examiner—E. A. Goldberg
Assistant Examiner—Gerald E. Preston
Attorney, Agent, or Firm—Dana M. Schmidt

[57] ABSTRACT

A molded article containing an electrical element buried therein has at least two leads, and portions of the leads are left exposed. The article is improved in that all of the leads are left confined within the confines of the article, the exposed portions of the leads being disposed within at least one aperture through the article.

Also a molding process for making the article useful as a catcher plate for an ink jet printer. Broadly, the process comprises the steps of placing the portions of the leads to be exposed, each in a groove in a post that is part of the mold, and closing the mold cavity with a closure plate containing an elastomeric material aligned with the post and leads, such elastomeric material having a coefficient of thermal expansion that is greater than that of the material used to make the mold.

3 Claims, 5 Drawing Sheets $h/d \leq 1/3$

MOLDED ARTICLE WITH EXPOSED, CONFINED LEADS, AND PROCESS FOR MAKING

FIELD OF THE INVENTION

This invention relates to an article molded out of a resin and having electrical leads left uncovered by the resin, and a process for molding the same.

BACKGROUND OF THE INVENTION

Injection or transfer molding processes are commonly used to shape articles out of "plastic". Such articles can be formed from thermoplastic or thermosetting resins, the composition of which is formulated to provide properties that in many cases rival that of metal. The article shape is controlled by the configuration of the mold cavity, as is well known.

It is common for such articles to include electrical elements for one reason or another. Such elements ar placed in the mold cavity during manufacturing so that the elements become buried or surrounded by the in-flowing resin. Necessarily, however, the wire leads, usually two or more of them, of such an element are left projecting or exposed, so that external electrical contact can be made to the element inside the molded article. A conventional method of doing this is to use a mold in which the leads stick out away from the mold cavity, and thus are not covered with resin when the element is otherwise covered.

An example of such an articles is a molded catcher assembly 26 of the type shown in U.S. Pat. No. 4,636,808. Such a catcher conveniently includes a resistive heater element, so that the temperature of both the catcher and the charge plate can be elevated, as is desired in ink jet printers.

Although such a method of molding the article is useful, the projection of the leads out of the molded article to a considerable extent can create a problem. That is, the leads are subject to being bent or broken, and cause the article to occupy substantially more volume than would be the case without the leads projecting away from the article. Furthermore, such leads do not necessarily occupy a fixed or consistent location, thus making further connection more difficult.

Therefore, prior to this invention there has been a need to mold the article so that the leads remain within the three-dimensional confines of the article, but without being covered by the resin. In other words, the leads must still be accessible for contact, e.g., by soldering, without taking up volume or space outside of the overall volume or space occupied by the article. However, any mold design that leaves all the leads within the intended three-dimensional confines of the article, and thus within the cavity of the mold, is in jeopardy of covering the leads with the resin and making them inaccessible.

SUMMARY OF THE INVENTION

I have discovered a mold process and finished article which feature a molded article with the leads kept within the three-dimensional confines of the article, and yet still exposed and not covered with resin.

More specifically, in accord with one aspect of the invention there is provided a molded article constructed from a resin and containing at least one aperture therethrough, the article further including an electrical element having at least two leads for making external electrical contact to the element, the element being disposed within the three-dimensional confines of the article and covered with the resin, but at least portions of the leads being uncovered by the resins. The article is improved in that the leads remain generally within the three-dimensional confines of the article, and at least the uncovered portions of the leads are located near a surface of the article within the at least one aperture.

In accord with a second aspect of the invention, there is provided a molding process in which a resin is injected under pressure into a mold having a mold cavity configured to mold the resin into an article of a predetermiend shape, the article including an electrical element having at least two leads to which electrical contact is made from an external source, the method comprising the steps of inserting the element into the mold cavity, closing the cavity with a closure plate, and injecting the resin under pressure into the closed cavity and surrounding the element. The process is improved in that it comprises the following additional steps:

(a) during the inserting step, placing said at least two leads each a post in the mold cavity and within a groove in the post disposed adjacent the position of the closure plate after closing the cavity, (b) in the closing step, using a closure plate that includes an elastomeric material having a coefficient of thermal expansion that exceeds that of the material of the mold, the elastomeric material being positioned and shaped to fit into the groove of each of the posts and around the leads, and (c) during the closing step, aligning the elastomeric material with each of the posts and leads, and contacting the leads with the elastomeric material, whereby the elastomeric material swells around the leads when the mold is heated, so as to shut-off flow of resin around the leads; and the leads are left exposed in the molded article, in an aperture formed by the mold post.

In accord with yet another aspect of the invention, there is provided a process for making a catcher plate for an ink jet printer. The process comprises the steps of (a) placing a resistive heater element in a cavity of a mold configured to shape the catcher plate, the placing step including the placement of all of the leads for such heater element generally within the confines of the mold cavity, (b) closing the mold so as to contact at least part of each of the element leads with an elastomeric material constructed to cooperate with the mold to shut-off flow of resin from proceeding around the parts of the leads, (c) injecting resin under pressure to cause the resin to flow into the mold cavity, and (d) keeping the mold closed for a period of time sufficient to cause the resin to harden into the catcher plate.

Thus, it is an advantageous feature of the invention that an article is produced in molded form with an electrical element embedded in it for connection to external circuits, without the leads of the electrical element projecting out away from the confines of the article itself.

It is a related advantageous feature of the invention that such an article is produced in a form that protects the leads of the electrical element against damage.

It is a related advantageous feature of the invention that such an article is produced in a form that anchors the leads in a consistent location for connection to external electrical sources.

It is another advantageous feature of the invention that a process is provided for making such a molded article while at the same time ensuring that the leads remain exposed after molding.

Other advantageous features will become apparent upon reference to the following detailed Description of the Preferred Embodiments, when read in light of the attached drawings.

DESCRIPTION OF THE PREFERRED EMBODIMENTS

The invention is described herein in the context of the preferred embodiments in which a portion of an ink jet printer is being manufactured. Specifically, the article being molded is a catcher plate made from thermoset resin, for such a printer. In addition, the invention is also applicable to any molded article, thermoset or thermoplastic, and any molding process, regardless of the end use of the article, wherein electrical leads of a buried element have to be left exposed to make contact to an external circuit.

Figure 1:
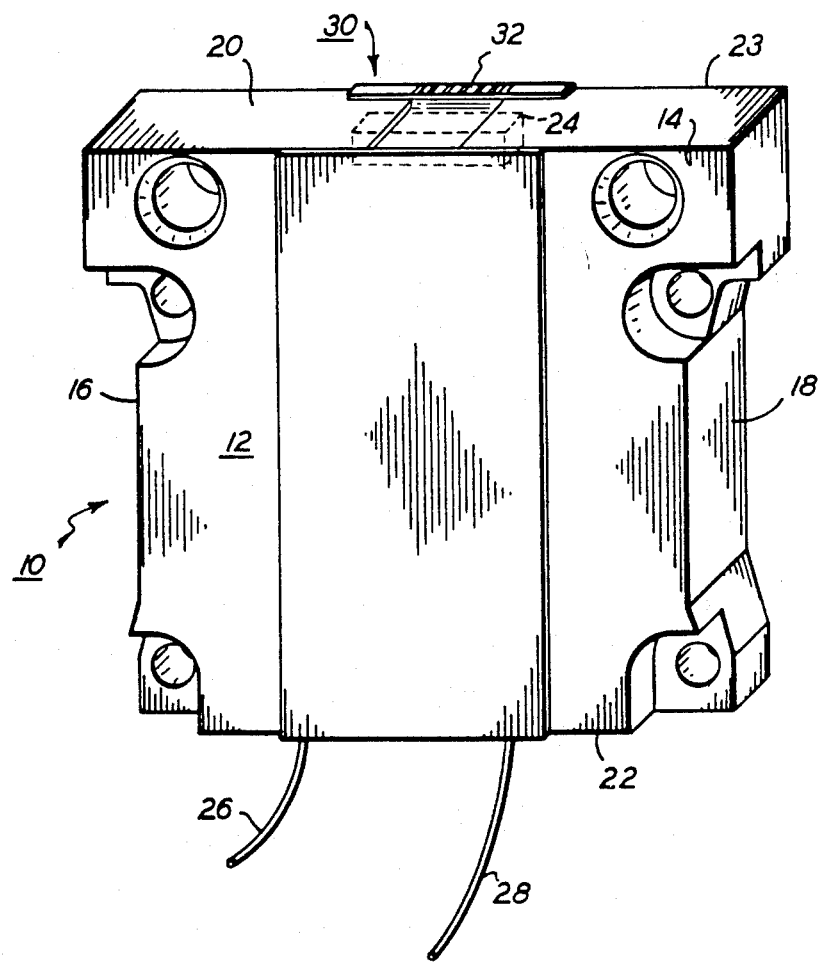
FIG. 1 is an isometric view of a molded article manufactured in accordance with the prior art teachings.

The prior art catcher plate 10, FIG. 1, features a molded thermo-set resin body 12 having a three-dimensional shape that is roughly that of a rectangular plate. Its confining surfaces are bottom surface 14, side surfaces 16 and 18, front face 20, rear face 22 and a top surface 23. An electrical element 24 (shown in phantom), namely a resistor, is buried within those confining surfaces, and leads 26 and 28 for the element project outwardly away from face 22. It is these projecting leads that are subject to damage and which make catcher plate 10 occupy more volume than just the space between surfaces 14–18 and faces 20–22.

When assembled, a charge plate 30 is glued or adhered into position on top surface 23 of the catcher plate 10. The front face 32 of the charge plate is disposed adjacent to front face 20 of the catcher plate.

The resins useful for the molded body are any thermo-setting resins, for example those described in U.S. Pat. No. 4,560,991 issued on Dec. 24, 1985.

Figure 2:
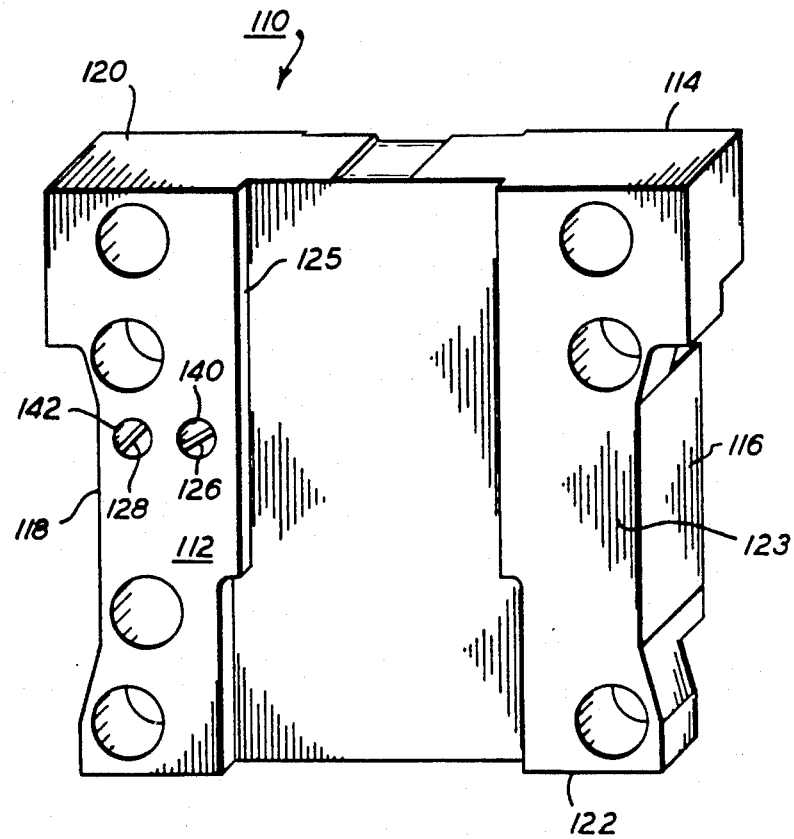
FIG. 2 is an isometric view similar to that of FIG. 1, but illustrating the invention without the charge plate attached.

Turning now to one aspect of the invention, namely the molded article, FIG. 2, a preferred catcher plate has similar features to those of FIG. 1. Parts similar to those previously described bear the same reference numeral, to which the value of 100 has been added. Thus, the catcher plate 110 of the invention comprises a molded body 112 of a rectangular plate shape. Its confining surfaces comprise bottom surface 114, side surfaces 116 and 118, front face 120, rear face 122, and a top surface 123 grooved at 125, to receive a charge plate 130, FIG. 4, substantially as shown in FIG. 1. The two plates 110 and 130 are adhered preferably by an adhesive layer 131, FIG. 5, or they can be molded all as one integral piece (not shown).

Figure 4:
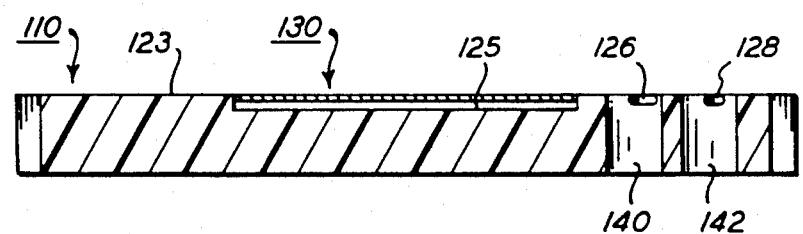
FIG. 4 is a sectional view taken generally along the line IV—IV of FIG. 3.
Figure 3:
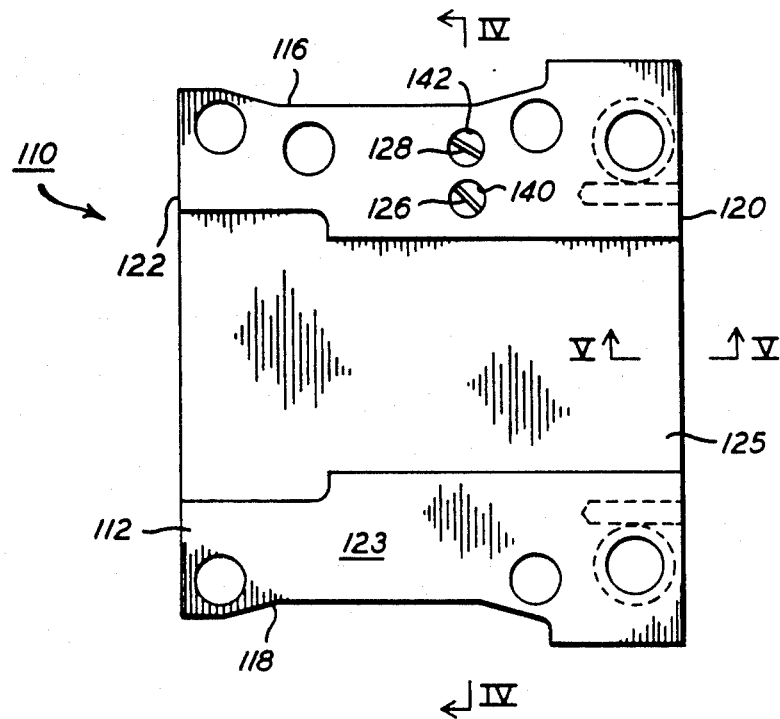
FIG. 3 is a plan view of the article of FIG. 2.
Figure 9:
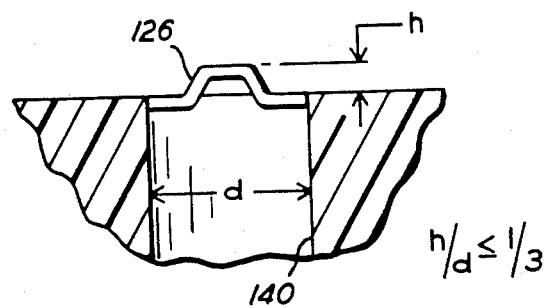
FIG. 9 is a fragmentary section view in elevation, through a device of the invention, but illustrating an alternate embodiment.

Unlike the construction in FIG. 1, the exposed metal leads 126 and 128, FIGS. 2–4, of the buried electrical element generally do not extend out beyond the confines of the limiting surfaces of body 112. As used herein, "generally not extending beyond the confines of the limiting surfaces", or "remaining generally within the three-dimensional confines", include shapes that allow the leads to project no more than that allowed by an aspect ratio less than or equal to $\frac{1}{3}$, since such projections are so minimal that they are equivalent to being strictly within the confines. This aspect ratio refers to the height of the projection (h) away from the surface of the article, divided by the dimension (d), such as the diameter, of the aperture, taken in the plan of that surface (see FIG. 9). For example, if d is 2 mm, the preferred size, then h cannot exceed $\frac{2}{3}$ mm. Most preferably, h is zero because the aspect ratio=0.

By this construction, leads 126 and 128 are confined to apertures 140 and 142 formed within the body, and are left exposed, that is, not covered with the resin of the body. Most preferably, leads 126 and 128 are positioned adjacent top surface 123, for easy access for external connection, such as by soldering, to the rest of the electrical circuit of the printer. Furthermore, they are anchored in place to provide a consistent location for the electrical connection.

Figure 5:
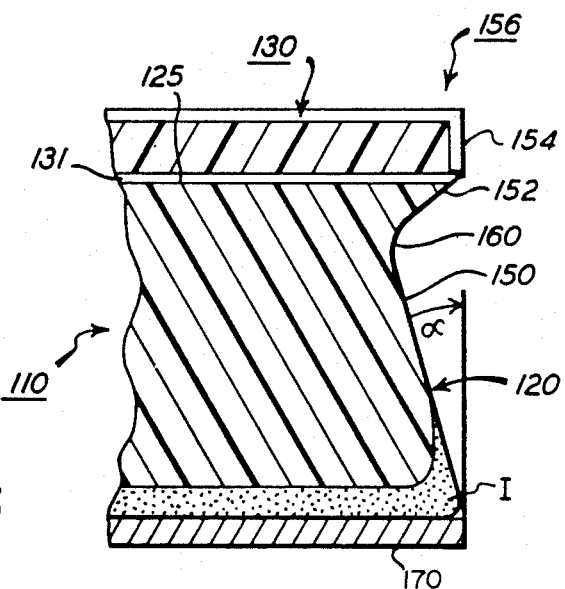
FIG. 5 is a fragmentary sectional view of the article of FIG. 3, assembled with a charge plate, taken generally along the line V—V of FIG. 3.

When used in a printer, FIG. 5, catcher plate 100 is adhered to the charge plate 130 so that the latter projects forward slightly of front face 120 of plate 110. The latter face 120 has a lower portion 150, called the toe portion, which is struck by charged ink drops. Upper portion 152 is a fillet that connects with toe portion 150 at an intersection line 160, and with the exposed surface 154 of the charge electrodes 156. The fillet and the slope of top portion 150, forming an angle alpha, are constructed as described in commonly owned U.S. (application Ser. No. 011570 filed on Feb. 6, 1987, by Evan L. Craig et al., entitled "Ink Jet Charging Plate and Drop-Catcher Assembly" now U.S. Pat. No. 4,757,328. That is, angle alpha, measured with respect to a vertical line from electrodes 154, provides a slope that gives a separation distance between the catcher and drops falling vertically past electrodes 154, that is greater at a point adjacent the intersection line 160 between portions 152 and 150, than at the bottom of toe portion 150 (adjacent to a trough 170 used to shunt the collected ink "I" back to the printer.) Useful values of alpha include, e.g., 3–5°. Upper portion 152 is effective to prevent build-up of ink at a deep recess that would otherwise occur if toe portion 150 were carried back to the surface of groove 125, at the slope generally created by angle alpha.

Figure 6:
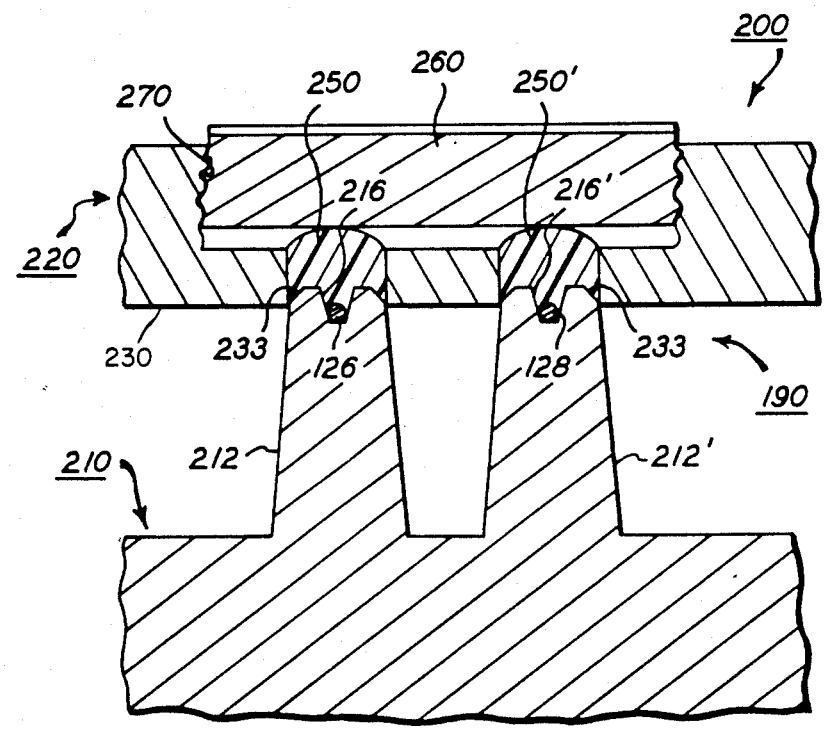
FIG. 6 is a fragmentary sectional view of a mold used to make the article of FIGS. 2–5.

In accord with another aspect of the invention, the molded article is prepared by the following process steps, FIG. 6: A mold cavity 190 is prepared in a mold 200 comprising a lower portion 210 and an upper portion 220, that come together at a plane of separation 230 in the manner of the conventional cavity used to prepare the article of FIG. 1. Mold 200 can be made of metal or ceramic. However, for each aperture desired within the molded article, a post 212, 212' is provided in lower portion 210. Because leads 126 and 128 are to be positioned in such apertures, posts 212 and 212' are notched at 216, 216', respectively, to receive the leads preferably just below the plane of separation 230. Mot preferably, therefore, the top surface 233 of posts 212, 212' extends above the separation plane 230, to insure that no resin extrudes over the molded apertures and/or leads 126 and 128.

In cooperation with the grooved posts, upper mold portion 220 is provided with a flow shut-off plug 250, 250' for each of the past, aligned to press onto the leads 126 and 128 and into grooves 216, 216'. Plugs 250 and 250' comprise any resilient material, having a coefficient of thermal expansion that is greater than that of the material of the mold. This value is selected to insure plugs 250 and 250' will expand rapidly enough when heated to shut-off resin from flowing into grooves 216, 216' and/or around leads 126 and 128. In addition, it preferably has a sufficient durometer hardness, to allow pressure to be applied to insure that the plug closes off flow paths of the resin. It has been found that a durometer hardness of at least about 30 shore "A" is effective for this purpose.

A useful example of such resilient material is "Silastic E" or "Silastic J" rubber, available from Dow Corning Co. They have a coefficient of thermal expansion that is at least $7 \times 10^{-4}$ cc/cc/°C., and a durometer hardness of at least 35 Shore A.

Posts 212 and 212' are tapered slightly, as is conventional, so as to be narrower at the top adjacent grooves 216, 216', than at their base. This facilitates removal of the molded article from around the posts.

A threaded back-up plug 260 is optionally screwed into threaded aperture 270 to apply the desired amount of pressure on plugs 250, 250'. Or alternatively, the plugs fit sufficiently tightly as to not require such back-up plugs.

Plugs 250 and 250' are readily preformed with the shape of the leads 126 and 128, by molding them over "dummy" leads of the same size and shape as leads 126 and 128.

The remaining parts of the mold 210 and 220, including the surfaces needed to form all the surfaces of the molded article, are readily apparent from the aforesaid description, to one skilled in the art.

The injection of the resin follows conventional procedures known in the art. The mold is left closed until the resin hardens, for conventional periods of time.

Figure 7:
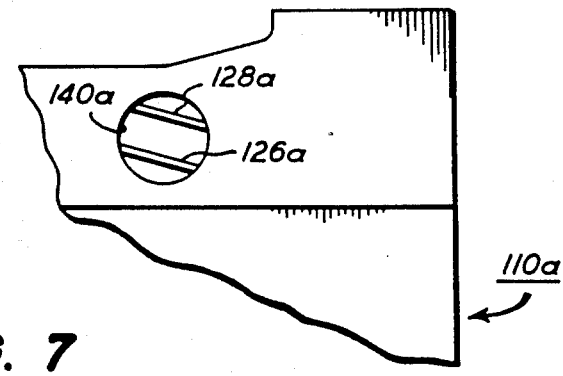
FIG. 7 is a fragmentary plan view similar to FIG. 3, but illustrating an alternative embodiment.
Figure 8:
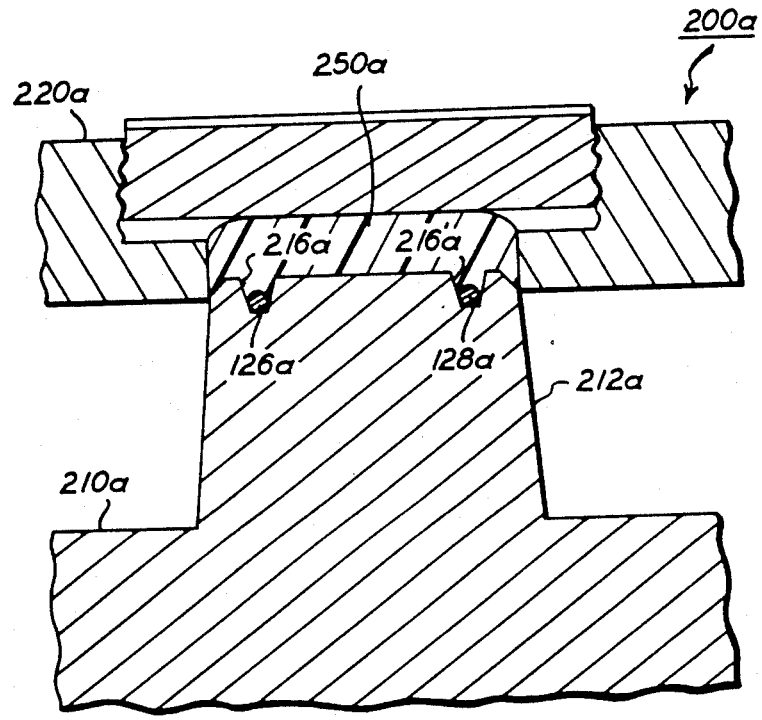
FIG. 8 is a fragmentary sectional view similar to FIG. 6, but of an alternative embodiment of the process for making the molded article.

It is not essential that leads 126 and 128 each occupy a separate aperture. The embodiment of FIG. 7, prepared using the mold of FIG. 8, illustrates the use of a single aperture. Parts similar to those previously described bear the same reference numeral to which the distinguishing suffix "a" has been appended.

Thus, leads 126a and 128a are both located in single aperture 140a of molded article 110a, recessed to be within the confines of that body as described in the previous embodiment. They are not covered by the resin, so as to be accessible for electrical contact. Mold 200a, FIG. 8, features only a single post 212a extending from lower portion 210a. Post 212a has two grooves 216a and 216'a, to receive leads 126a and 128a, respectively. Only a single plug 250a of resilient material is needed in upper portion 220a, aligned with post 212a.

The invention has been described in detail with particular reference to preferred embodiments thereof, but it will be understood that variations and modifications can be effected within the spirit and scope of the invention.

What is claimed is:

1. In a molded article constructed from a resin to have a three-dimensional shape with exterior surfaces and containing at least one aperture extending all the way through said three-dimensional shape, said article further including an electrical element having at least two leads for making external electrical contact to said element, said element being disposed within the three-dimensional confines of said article and covered with said resin, but at least portions of said leads being uncovered by said resin;

the improvement wherein said leads remain completely covered by said resin between said surfaces with the only exception being portions exposed within said at least one aperture.

2. An article as defined in claim 1, wherein said article is a catcher plate for an ink jet printer, and said element is a resistor used to generate heat.

3. An article as defined in claim 1, wherein said uncovered portions of said leads are positioned near a surface of said molded article.

* * * * *